US012149534B2

(12) United States Patent
Arora et al.

(10) Patent No.: US 12,149,534 B2
(45) Date of Patent: Nov. 19, 2024

(54) SYSTEM, METHOD, AND PATTERN FOR INTEGRATING INCOMPATIBLE OIDC IMPLEMENTATIONS

(71) Applicant: JPMorgan Chase Bank, N.A., New York, NY (US)

(72) Inventors: Anupam Arora, Middletown, DE (US); Paramveer Singh Thind, Pittsburg, CA (US); Jose Rudel De Castro, Daly City, CA (US); Akhilesh Gupta, West Chester, PA (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 434 days.

(21) Appl. No.: 17/656,105

(22) Filed: Mar. 23, 2022

(65) Prior Publication Data
US 2023/0308448 A1   Sep. 28, 2023

(51) Int. Cl.
*H04L 67/133*   (2022.01)
*H04L 9/40*   (2022.01)
(Continued)

(52) U.S. Cl.
CPC ......... *H04L 63/102* (2013.01); *H04L 67/133* (2022.05); *H04L 67/2866* (2013.01);
(Continued)

(58) Field of Classification Search
USPC .......................................................... 726/4
See application file for complete search history.

(56) References Cited

U.S. PATENT DOCUMENTS

2021/0243269 A1 * 8/2021 Gibbs ................. H04L 67/306
2021/0390170 A1 * 12/2021 Olden ................. H04L 63/08
(Continued)

FOREIGN PATENT DOCUMENTS

CA    3177658 A1 * 10/2020    ............. G06Q 10/10
EP    3108632 B1 *  1/2018    ............. G06F 9/452
(Continued)

OTHER PUBLICATIONS

Li et al., "Research on decentralized identity and access management model based on the OIDC protocol, " 2020 International Conference on E-Commerce and Internet Technology (ECIT). Proceedings: IEEE Computer Society, pp. 252-255, (Year: 2020).*

*Primary Examiner* — Sakinah White Taylor
(74) *Attorney, Agent, or Firm* — GREENBLUM & BERNSTEIN, P.L.C.

(57) ABSTRACT

Various methods, apparatuses/systems, and media for integrating incompatible open identity connect (OIDC) implementations are disclosed. A processor creates a custom protocol within an API gateway that understands data coming in from the OIDC protocol; receives data from the OIDC protocol; and determines, based on analyzing the data received from the OIDC protocol, any communication gap between an application and an identity layer, wherein the API gateway is implemented between the application and the identity layer. The processor then converts, in response to determining a communication gap, the data received from the OIDC protocol into a formatted data that is understandable by the application; transmits the formatted data to the application; and automatically eliminates any communication gap between the application and the identity layer based on the received formatted data.

20 Claims, 8 Drawing Sheets

(51) Int. Cl.
*H04L 67/2866* (2022.01)
*H04L 67/2871* (2022.01)
*H04L 67/50* (2022.01)
*H04L 67/565* (2022.01)

(52) U.S. Cl.
CPC .......... *H04L 67/2871* (2013.01); *H04L 67/50* (2022.05); *H04L 67/565* (2022.05)

(56) References Cited

U.S. PATENT DOCUMENTS

| | | | | |
|---|---|---|---|---|
| 2021/0392136 | A1* | 12/2021 | Modi | H04L 9/3234 |
| 2022/0247712 | A1* | 8/2022 | Lin | H04L 65/1063 |
| 2022/0337578 | A1* | 10/2022 | Mankekar | G06F 21/41 |
| 2023/0079621 | A1* | 3/2023 | Gupta | G06F 16/1748 |
| | | | | 707/664 |

FOREIGN PATENT DOCUMENTS

| | | | | |
|---|---|---|---|---|
| WO | WO-2017196774 | A1 * | 11/2017 | ......... H04L 63/0281 |
| WO | WO-2021211911 | A1 * | 10/2021 | |

\* cited by examiner

800

```
{
    "aud": "CompanyName:URI:RS-105006-14656-omniai-PROD",
    "iss": "http://ida.CompanyName.com/adfs/services/trust",
    "iat": 1616619798,
    "exp": 1616662998,
    "CompanyNameIdentifier": "X738839",
    "EmployeeCorporateID": "X738839",
    "FirstName": "XXXXXX",
    "LastName": "YYYYYY",
    "DisplayName": "YYYYYY, XXXXXX",
    "Email": "XXXXXX.YYYYYY@CompanyName.com",
    "EmployeeType": "EMP",
    "Role": [
        "DlWorker-14656-105006-PROD",
        "DlAdmin-14656-105006-PROD",
        "SMGT97e8db27b89606a22347d3cf439771e5-14656-105006-PROD",
        "cb7dd496b2c78b1f350ba1879609b317-14656-105006-PROD",
        "592a7bd2ae7f1129ac766df401fcef80-14656-105006-PROD",
        "dedc8dac38f34dbac8eeae67d76c0ee4-14656-105006-PROD",
        "7a2e66dd83d3288057ab4480cba2e8a8-14656-105006-PROD",
        "f720611cb54f6d82821d3a2975265dc3-14656-105006-PROD",
        "Foundation-14656-105006-PROD",
        "7a55cd32d4bd352cb8784ddfdc7628a3-14656-105006-PROD",
        "9d66670fc4cafc6c6843016b9204b254-14656-105006-PROD",
        "f1b4e050cbbfec605998936738cac1e6-14656-105006-PROD",
        "Onboard-14656-105006-PROD",
        "00cde6915376914aae739fc26820c070-14656-105006-PROD",
        "958228cbffd6c9174afdc3523f5469c6-14656-105006-PROD",
        "c099bce13207e13cf73ff655b3f5f3cf-14656-105006-PROD",
        "40307c14289a477a605fdc9994ecfad8-14656-105006-PROD",
        "SMGTbda4ba792631c30a3355b4e7d2b9c8b3-14656-105006-PROD",
        "105006ApplicationEngineer-14656-105006-PROD",
        "Ops-14656-105006-PROD"
    ],
    "ClientIPAddress": "10.173.54.120",
    "apptype": "Public",
    "appid": "PC-105006-SID-15187-PROD",
    "authmethod": "http://schemas.microsoft.com/ws/2008/06/identity/authenticationmethod/windows",
    "auth_time": "2021-03-24T21:03:18.664Z",
    "ver": "1.0"
}
```

FIG. 8

SYSTEM, METHOD, AND PATTERN FOR INTEGRATING INCOMPATIBLE OIDC IMPLEMENTATIONS

TECHNICAL FIELD

This disclosure generally relates to user authentication and authorization, and, more particularly, to methods and apparatuses for implementing a platform and language agnostic identity layer verification proxy module configured to create a pattern (proxy) for integrating incompatible OIDC (open identity connect) implementations for automatically authenticating and authorizing user access to an application.

BACKGROUND

The developments described in this section are known to the inventors. However, unless otherwise indicated, it should not be assumed that any of the developments described in this section qualify as prior art merely by virtue of their inclusion in this section, or that these developments are known to a person of ordinary skill in the art.

OIDC is a simple identity layer on top of the OAuth protocol that allows clients to verify the end user's identity based on the authentication performed by the authorization server. For example, a typical method for accessing resources hosted on a server from a mobile device or other computing devices may include hosting a native application on the mobile device, the native mobile device having a user agent for a pre-authenticated user. During that process, a typical method may include receiving a redirection request from an authentication server (i.e., OIDC provider) for an authentication token for a pre-authenticated user in response to a request for the resource hosted on the server; sending the authentication token for the pre-authenticated user from the user agent of the mobile device to the authentication server in response to the redirection request from the authentication server; authenticating the authentication token from the user agent on the authentication server and creating an authentication cookie for the authenticated user to access the resource on the server; sending the authentication cookie to the mobile device; an permitting the pre-authenticated user to access the resource hosted on the server upon receipt of the authentication cookie by the server.

Most vendor applications use OIDC to authenticate users against an identity provider. The process may break down for vendors due to incompatibility of OAuth/OIDC standards. Most vendors follow the Open OAUTH 2.0 standard per RFC 6749. However, an identity provider that follows the Microsoft standard may have trouble to authenticate users due to incompatibility. For example, for most part there may be a good overlap, however, on the/token call, the RFC 6749 standard mandates the use of client_secret, whereas the Microsoft standard does not rely on client_secret. In addition, the Microsoft standard does not return back an ID Token. A custom or userinfo API (application programming interface) call needs to be created to return back user specific information.

Therefore, there is a need for an advanced tool that can address these conventional shortcomings.

SUMMARY

The present disclosure, through one or more of its various aspects, embodiments, and/or specific features or sub-components, provides, among other features, various systems, servers, devices, methods, media, programs, and platforms for implementing a platform and language agnostic identity layer verification proxy module that is configured to create a pattern (proxy) for integrating incompatible OIDC implementations for automatically authenticating and authorizing users against pre-defined roles to access to an internal application within an internal network or an external application outside of the internal network requiring additional firewall authentication, but the disclosure is not limited thereto.

According to an aspect of the present disclosure, a method for integrating incompatible OIDC implementations by utilizing one or more processors along with allocated memory is disclosed. The method may include: establishing a communication link between an application and an API gateway via a communication interface; implementing the API gateway between the application and an identity layer configured to verify identity and roles of a user of the application, wherein the identity layer is an OIDC provider having an OIDC protocol configured for authenticating and authorizing the user based on verifying pre-stored user profile data based on roles of the user and identity information data of the user from a database; creating a custom protocol within the API gateway; receiving data from the OIDC protocol; determining, based on analyzing the data received from the OIDC protocol, any communication gap between the application and the identity layer; converting, in response to determining a communication gap, the data received from the OIDC protocol into a formatted data that is understandable by the application; transmitting the formatted data to the application; and automatically eliminating the communication gap between the application and the identity layer based on the received formatted data.

According to a further aspect of the present disclosure, the application may be an external application, external to the OIDC provider, running on a public cloud and requires firewall authentication for access.

According to yet another aspect of the present disclosure, the API gateway may be an external API gateway implemented between the external application and the identity layer configured to verify identity and roles of the user of the external application.

According to a further aspect of the present disclosure, the application may be an internal application, internal to the OIDC provider, running on a private cloud and does not require firewall authentication for access.

According to an additional aspect of the present disclosure, the API gateway may be an internal API gateway implemented between the internal application and the identity layer configured to verify identity and roles of the user of the internal application.

According to another aspect of the present disclosure, the method may further include: creating the custom protocol in the API gateway to check for specific role prefixes of the user and return correctly formatted roles back to the application.

According to yet another further aspect of the present disclosure, the method may further include: creating the custom protocol in a manner such that the protocol understands the data coming in from the OIDC protocol and modifies the data so that when a request comes in from the application, the request first hits the API gateway for necessary conversion without directly going to the identity layer.

According to an additional aspect of the present disclosure, the method may further include: creating the custom protocol in a manner such that the protocol understands the data coming in from the identity layer; and modifying the data so that when the identity layer returns data to the application, the data first hits the API gateway for necessary conversion without directly going to the application.

According to an aspect of the present disclosure, a system for integrating incompatible OIDC implementations is disclosed. The system may include: a processor; and a memory operatively connected to the processor via a communication interface, the memory storing computer readable instructions, when executed, may cause the processor to: establish a communication link between an application and an API gateway via a communication interface; implement the API gateway between the application and an identity layer configured to verify identity and roles of a user of the application, wherein the identity layer is an OIDC provider having an OIDC protocol configured for authenticating and authorizing the user based on verifying pre-stored user profile data based on roles of the user and identity information data of the user from a database; create a custom protocol within the API gateway; receive data from the OIDC protocol; determine, based on analyzing the data received from the OIDC protocol, any communication gap between the application and the identity layer; convert, in response to determining a communication gap, the data received from the OIDC protocol into a formatted data that is understandable by the application; transmit the formatted data to the application; and automatically eliminate the communication gap between the application and the identity layer based on the received formatted data.

According to a further aspect of the instant disclosure, the processor may be further configured to: create the custom protocol in the API gateway to check for specific role prefixes of the user and return correctly formatted roles back to the application.

According to an additional aspect of the instant disclosure, the processor may be configured to create the custom protocol in a manner such that the protocol understands the data coming in from the identity layer and modifies the data so that when the identity layer returns data to the application, the data first hits the API gateway for necessary conversion without directly going to the application.

According to yet another aspect of the present disclosure, the processor may be configured to: create the custom protocol in a manner such that the protocol understands the data coming in from the identity layer; and modify the data so that when the identity layer returns data to the application, the data first hits the API gateway for necessary conversion without directly going to the application.

According to an aspect of the present disclosure, a non-transitory computer readable medium configured to store instructions for integrating incompatible OIDC implementations is disclosed. The instructions, when executed, may cause a processor to perform the following: establishing a communication link between an application and an API gateway via a communication interface; implementing the API gateway between the application and an identity layer configured to verify identity and roles of a user of the application, wherein the identity layer is an OIDC provider having an OIDC protocol configured for authenticating and authorizing the user based on verifying pre-stored user profile data based on roles of the user and identity information data of the user from a database; creating a custom protocol within the API gateway; receiving data from the OIDC protocol; determining, based on analyzing the data received from the OIDC protocol, any communication gap between the application and the identity layer; converting, in response to determining a communication gap, the data received from the OIDC protocol into a formatted data that is understandable by the application; transmitting the formatted data to the application; and automatically eliminating the communication gap between the application and the identity layer based on the received formatted data.

According to a further aspect of the present disclosure, the instructions, when executed, may further cause the processor to perform the following: creating the custom protocol in the API gateway to check for specific role prefixes of the user and return correctly formatted roles back to the application.

According to yet another further aspect of the present disclosure, the instructions, when executed, may further cause the processor to perform the following: creating the custom protocol in a manner such that the protocol understands the data coming in from the OIDC protocol; and modifying the data so that when a request comes in from the application, the request first hits the API gateway for necessary conversion without directly going to the identity layer.

According to an additional aspect of the present disclosure, the instructions, when executed, may further cause the processor to perform the following: creating the custom protocol in a manner such that the protocol understands the data coming in from the identity layer; and modifying the data so that when the identity layer returns data to the application, the data first hits the API gateway for necessary conversion without directly going to the application.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

FIG. 8 illustrates an exemplary structure of a token generated by the identity layer verification proxy module of FIG. 4 in accordance with an exemplary embodiment.

DETAILED DESCRIPTION

Figure 1:
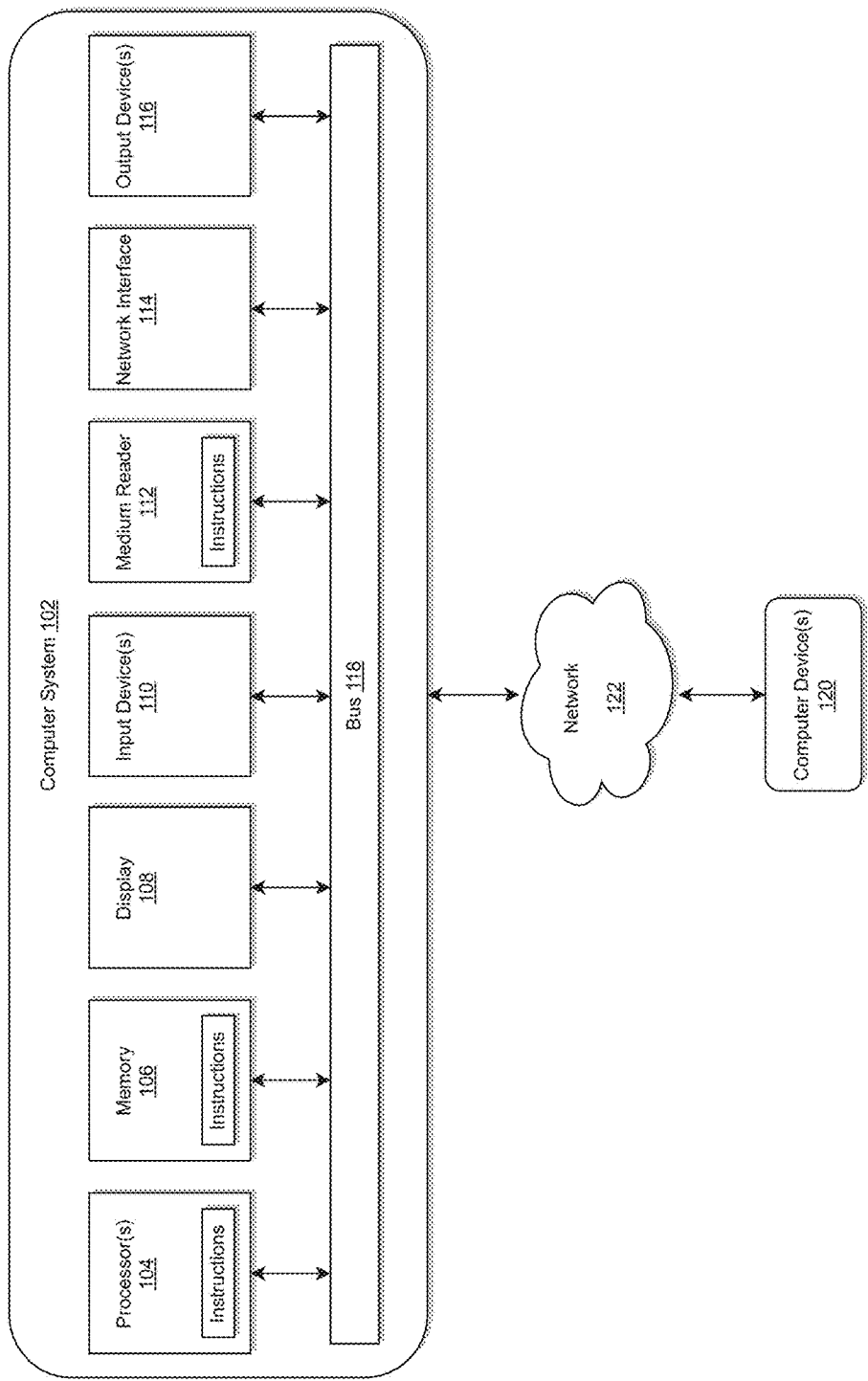
FIG. 1 illustrates a computer system for implementing a platform and language agnostic identity layer verification proxy module for automatically authenticating and authorizing user access to an application in accordance with an exemplary embodiment.

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

As is traditional in the field of the present disclosure, example embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the example embodiments may be physically separated into two or more interacting and discrete blocks, units and/or modules without departing from the scope of the inventive concepts. Further, the blocks, units and/or modules of the example embodiments may be physically combined into more complex blocks, units and/or modules without departing from the scope of the present disclosure.

FIG. 1 is an exemplary system for implementing a platform and language agnostic identity layer verification proxy module for automatically authenticating and authorizing user access to an application in accordance with the embodiments described herein. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term system shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid-state display, a cathode ray tube (CRT), a plasma display, or any other known display.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and an operation mode having parallel processing capabilities. Virtual computer system processing can be constructed to implement one or more of the methods or functionality as described herein, and a processor described herein may be used to support a virtual processing environment.

The configuration/data files, according to exemplary embodiments, may be written using JSON (Java Script Object Notation), but the disclosure is not limited thereto. For example, the configuration/data files can easily be extended to other readable file formats such as XML, YAML, etc., or any other configuration based languages.

Figure 2:
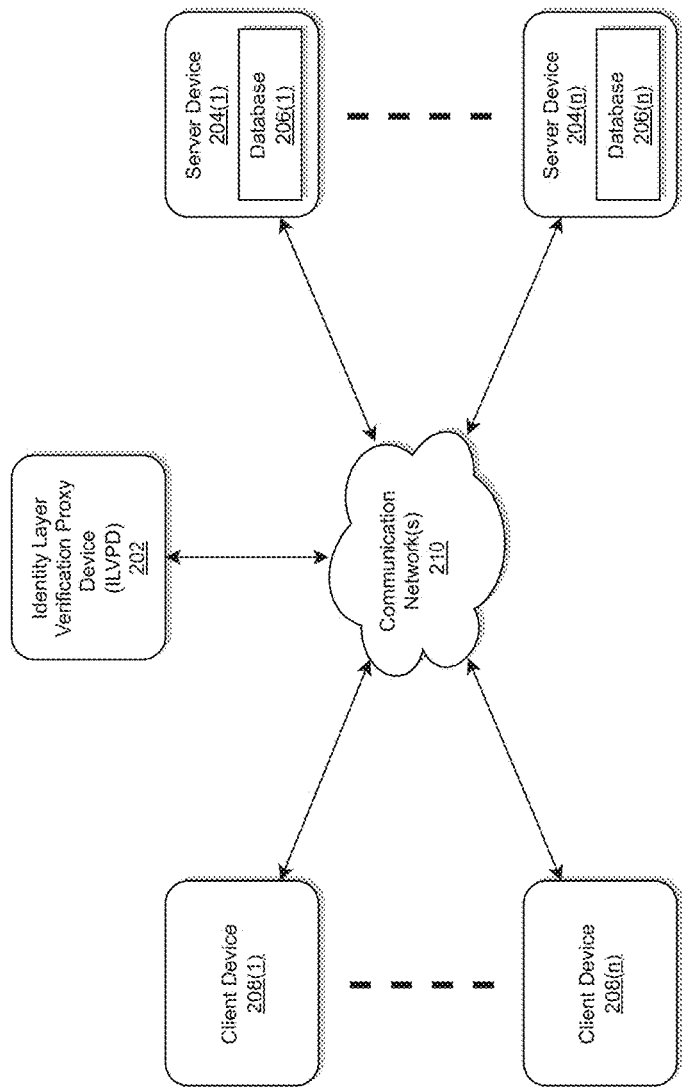
FIG. 2 illustrates an exemplary diagram of a network environment with a platform and language agnostic identity layer verification proxy device in accordance with an exemplary embodiment.

Referring to FIG. 2, a schematic of an exemplary network environment 200 for implementing a platform and language agnostic identity layer verification proxy device (ILVPD) of the instant disclosure is illustrated.

According to exemplary embodiments, the above-described problems associated with conventional approach of user authentication and authorization may be overcome by implementing an ILVPD 202 as illustrated in FIG. 2 that may implement a platform and language agnostic identity layer verification proxy module for integrating incompatible OIDC implementations for automatically authenticating and authorizing users against pre-defined roles to access to an internal application within an internal network or an external application outside of the internal network requiring additional firewall authentication, but the disclosure is not limited thereto.

The ILVPD 202 may be the same or similar to the computer system 102 as described with respect to FIG. 1.

The ILVPD 202 may store one or more applications that can include executable instructions that, when executed by the ILVPD 202, cause the ILVPD 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the ILVPD 202 itself, may be located in virtual server(s) running in a cloud-based computing environment rather than being tied to one or more specific physical network computing devices. Also, the application(s) may be running in one or more virtual machines (VMs) executing on the ILVPD 202. Additionally, in one or more embodiments of this technology, virtual machine(s) running on the ILVPD 202 may be managed or supervised by a hypervisor.

In the network environment 200 of FIG. 2, the ILVPD 202 is coupled to a plurality of server devices 204(1)-204(n) that hosts a plurality of databases 206(1)-206(n), and also to a plurality of client devices 208(1)-208(n) via communication network(s) 210. A communication interface of the ILVPD 202, such as the network interface 114 of the computer system 102 of FIG. 1, operatively couples and communicates between the ILVPD 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the ILVPD 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 202 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The ILVPD 202 may be a standalone device or integrated with one or more other devices or apparatuses, such as one or more of the server devices 204(1)-204(n), for example. In one particular example, the ILVPD 202 may be hosted by one of the server devices 204(1)-204(n), and other arrangements are also possible. Moreover, one or more of the devices of the ILVPD 202 may be in the same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the ILVPD 202 via the communication network(s) 210 according to the HTTP-based and/or JSON protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store metadata sets, data quality rules, and newly generated data.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. Client device in this context refers to any computing device that interfaces to communications network(s) 210 to obtain resources from one or more server devices 204(1)-204(n) or other client devices 208(1)-208(n).

According to exemplary embodiments, the client devices 208(1)-208(n) in this example may include any type of computing device that can facilitate the implementation of the ILVPD 202 that may efficiently provide a platform for implementing a platform and a language agnostic identity layer verification proxy module that is configured to create a pattern (proxy) for integrating incompatible OIDC implementations for automatically authenticating and authorizing users against pre-defined roles to access to an internal application within an internal network or an external application outside of the internal network requiring additional firewall authentication, but the disclosure is not limited thereto.

The client devices 208(1)-208(n) may run interface applications, such as standard web browsers or standalone client applications, which may provide an interface to communicate with the ILVPD 202 via the communication network(s) 210 in order to communicate user requests. The client devices 208(1)-208(n) may further include, among other features, a display device, such as a display screen or touchscreen, and/or an input device, such as a keyboard, for example.

Although the exemplary network environment 200 with the ILVPD 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the ILVPD 202, the server devices 204(1)-204(n), or the client devices 208(1)-208(n), for example, may be configured to operate as virtual instances on the same physical machine. For example, one or more of the ILVPD 202, the server devices 204(1)-204(n), or the client devices 208(1)-208(n) may operate on the same physical device rather than as separate devices communicating through communication network(s) 210. Additionally, there may be more or fewer ILVPDs 202, server devices 204(1)-204(n), or client devices 208(1)-208(n) than illustrated in FIG. 2. According to exemplary embodiments, the ILVPD 202 may be configured to send code at run-time to remote server devices 204(1)-204(n), but the disclosure is not limited thereto.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
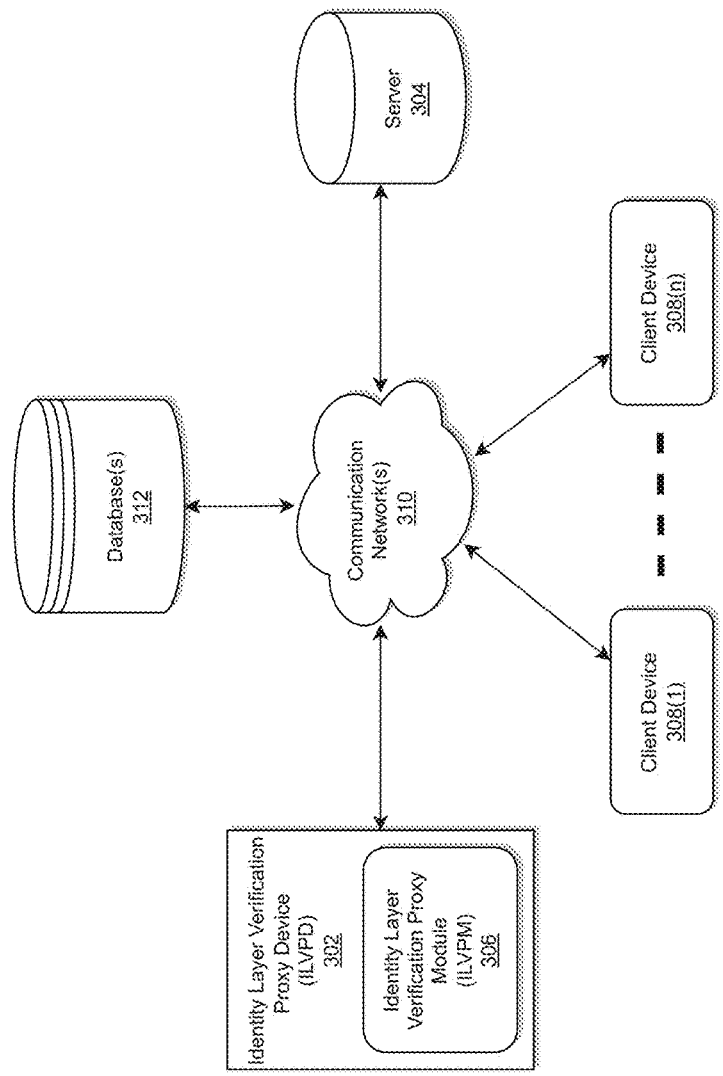
FIG. 3 illustrates a system diagram for implementing a platform and language agnostic identity layer verification proxy device having a platform and language agnostic identity layer verification proxy module in accordance with an exemplary embodiment.

FIG. 3 illustrates a system diagram for implementing a platform and language agnostic identity layer verification proxy device (ILVPD) having a platform and language agnostic identity layer verification proxy module (ILVPM) in accordance with an exemplary embodiment.

As illustrated in FIG. 3, the system 300 may include an ILVPD 302 within which an ILVPM 306 is embedded, a server 304, a database(s) 312, a plurality of client devices 308(1) . . . 308(n), and a communication network 310.

According to exemplary embodiments, the ILVPD 302 including the ILVPM 306 may be connected to the server 304, and the database(s) 312 via the communication network 310. The ILVPD 302 may also be connected to the plurality of client devices 308(1) 308(n) via the communication network 310, but the disclosure is not limited thereto.

According to exemplary embodiment, the ILVPD 302 is described and shown in FIG. 3 as including the ILVPM 306, although it may include other rules, policies, modules, databases, or applications, for example. According to exemplary embodiments, the database(s) 312 may be configured to store ready to use modules written for each API for all environments. Although only one database is illustrated in FIG. 3, the disclosure is not limited thereto. Any number of desired databases may be utilized for use in the disclosed invention herein. The database(s) may be a private or public cloud databases (i.e., AWS, S3, etc.), a log database (i.e., Splunk) that may that may produce programming for searching, monitoring, and analyzing machine-generated data via a Web-style interface, etc., but the disclosure is not limited thereto.

According to exemplary embodiments, the ILVPM 306 may be configured to receive real-time feed of data from the plurality of client devices 308(1) . . . 308(n) via the communication network 310.

As will be described below, the ILVPM 306 may be configured to establish a communication link between an application and an API gateway via the communication network 310; implement the API gateway between the application and an identity layer configured to verify identity and roles of a user of the application, wherein the identity layer is an OIDC provider having an OIDC protocol configured for authenticating and authorizing the user based on verifying pre-stored user profile data based on roles of the user and identity information data of the user from a database; create a custom protocol within the API gateway; receive data from the OIDC protocol; determine, based on analyzing the data received from the OIDC protocol, any communication gap between the application and the identity layer; convert, in response to determining a communication gap, the data received from the OIDC protocol into a formatted data that is understandable by the application; transmit the formatted data to the application; and automatically eliminate the communication gap between the application and the identity layer based on the received formatted data, but the disclosure is not limited thereto.

The plurality of client devices 308(1) . . . 308(n) are illustrated as being in communication with the ILVPD 302. In this regard, the plurality of client devices 308(1) . . . 308(n) may be "clients" of the ILVPD 302 and are described herein as such. Nevertheless, it is to be known and understood that the plurality of client devices 308(1) . . . 308(n) need not necessarily be "clients" of the ILVPD 302, or any entity described in association therewith herein. Any additional or alternative relationship may exist between either or both of the plurality of client devices 308(1) . . . 308(n) and the ILVPD 302, or no relationship may exist.

The first client device 308(1) may be, for example, a smart phone. Of course, the first client device 308(1) may be any additional device described herein. The second client device 308(n) may be, for example, a personal computer (PC). Of course, the second client device 308(n) may also be any additional device described herein. According to exemplary embodiments, the server 304 may be the same or equivalent to the server device 204 as illustrated in FIG. 2.

The process may be executed via the communication network 310, which may comprise plural networks as described above. For example, in an exemplary embodiment, one or more of the plurality of client devices 308(1) . . . 308(n) may communicate with the ILVPD 302 via broadband or cellular communication. Of course, these embodiments are merely exemplary and are not limiting or exhaustive.

The computing device 301 may be the same or similar to any one of the client devices 208(1)-208(n) as described with respect to FIG. 2, including any features or combination of features described with respect thereto. The ILVPD 302 may be the same or similar to the ILVPD 202 as described with respect to FIG. 2, including any features or combination of features described with respect thereto.

Figure 4:
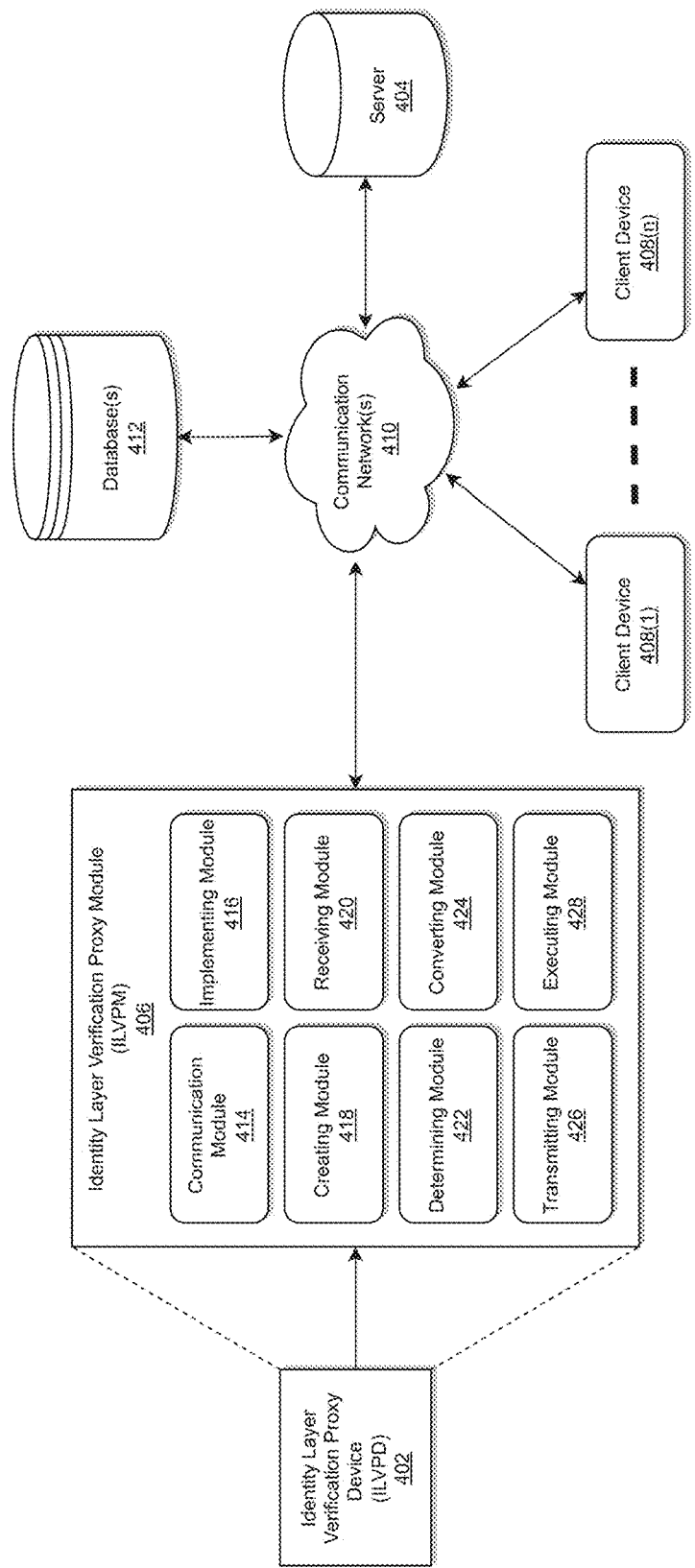
FIG. 4 illustrates a system diagram for implementing a platform and language agnostic identity layer verification proxy module of FIG. 3 in accordance with an exemplary embodiment.

FIG. 4 illustrates a system diagram for implementing a platform and language agnostic ILVPM of FIG. 3 in accordance with an exemplary embodiment.

According to exemplary embodiments, the system 400 may include a platform and language agnostic ILVPD 402 within which an ILVPM 406 is embedded, a server 404, database(s) 412, and a communication network 410.

According to exemplary embodiments, the ILVPD 402 including the ILVPM 406 may be connected to the server 404 and the database(s) 412 via the communication network 410. The ILVPD 402 may also be connected to the plurality of client devices 408(1)-408(n) via the communication network 410, but the disclosure is not limited thereto. The ILVPM 406, the server 404, the plurality of client devices 408(1)-408(n), the database(s) 412, the communication network 410 as illustrated in FIG. 4 may be the same or similar to the ILVPM 306, the server 304, the plurality of client devices 308(1)-308(n), the database(s) 312, the communication network 310, respectively, as illustrated in FIG. 3.

According to exemplary embodiments, as illustrated in FIG. 4, the ILVPM 406 may include a communication module 414, an implementing module 416, a creating module 418, a receiving module 420, a determining module 422, a converting module 424, a transmitting module 426, and an executing module 428.

According to exemplary embodiments, each of the communication module 414, implementing module 416, creating module 418, receiving module 420, determining module 422, converting module 424, transmitting module 426, and the executing module 428 of the ILVPM 406 may be physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies.

According to exemplary embodiments, each of the communication module 414, implementing module 416, creating module 418, receiving module 420, determining module 422, converting module 424, transmitting module 426, and the executing module 428 of the ILVPM 406 may be implemented by microprocessors or similar, and may be programmed using software (e.g., microcode) to perform various functions discussed herein and may optionally be driven by firmware and/or software.

Alternatively, according to exemplary embodiments, each of the communication module 414, implementing module 416, creating module 418, receiving module 420, determining module 422, converting module 424, transmitting module 426, and the executing module 428 of the ILVPM 406 may be implemented by dedicated hardware, or as a combination of dedicated hardware to perform some functions and a processor (e.g., one or more programmed microprocessors and associated circuitry) to perform other functions.

According to exemplary embodiments, each of the communication module 414, implementing module 416, creating module 418, receiving module 420, determining module 422, converting module 424, transmitting module 426, and the executing module 428 of the ILVPM 406 may be called via corresponding API.

The process may be executed via the communication module 414 and the communication network 410, which may comprise plural networks as described above. For example, in an exemplary embodiment, the various components of the ILVPM 406 may communicate with the server 404, and the database(s) 412 via the communication module 414 and the communication network 410. Of course, these embodiments are merely exemplary and are not limiting or exhaustive.

According to exemplary embodiments, the communication network 410 and the communication module 414 may be configured to establish a link between the database(s) 412, the client devices 408(1)-408(n) and the ILVPM 406.

Figure 5:
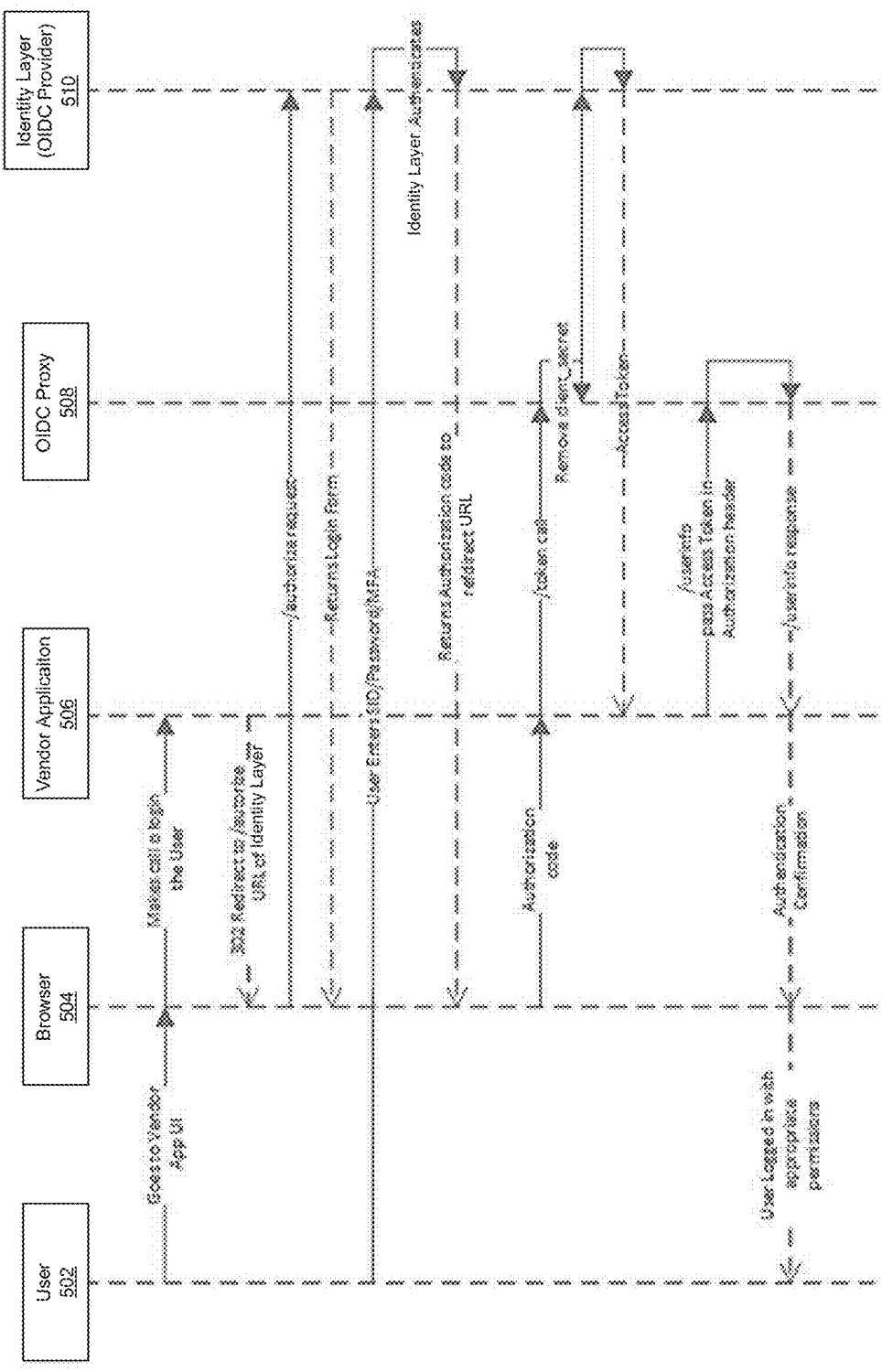
FIG. 5 illustrates an exemplary use case flow diagram implemented by the platform and language agnostic identity layer verification proxy module of FIG. 4 in accordance with an exemplary embodiment.

FIG. 5 illustrates an exemplary use case flow diagram 500 implemented by the platform and language agnostic ILVPM 406 of FIG. 4 in accordance with an exemplary embodiment. As illustrated in FIG. 5, the exemplary use case flow diagram 500 may include a user 502 communicating with a vendor application 506 via a browser 504. An OIDC proxy 508 may be implemented between the vendor application 506 and an identity layer 510. The identity layer 510 may be an OIDC provider that allows the vendor application 506 to verify the identity of the user 502 and to obtain basic user profile information, i.e., user ID, name, title, etc., but the disclosure is not limited thereto.

For example, user input data received from the user 502 may go to the vendor application 506 UI via the browser 504. The ILVPM 406 then makes a call to the vendor application 506 to login the user 502. The vendor application 506 may either redirect to or authorize by sending a URL of the identity layer proxy (i.e., a URL of the OIDC proxy 508). In response, the identity layer 510 returns login form to the browser 504. User 502 then enters SID, password, MFA (multifactor authentication), etc., to the identity layer 510. The identity layer 510 then authenticates the user 502 and returns an authorization code to redirect URL to the browser 504. The browser 504 sends the authorization code the vendor application 506. The vendor application 506 then makes to token call to the OIDC proxy 508 and removes the client_secret in the token call. This allows the vendors that are RFC 6749 compliant to work seamlessly with the identity layer 510 without making any code changes. The identity layer 510 then sends an access token to the vendor application 506. The vendor application 506 utilizes the user information and passes the access token in authorization header when sending to the OIDC proxy 508. OIDC proxy 508 then sends user information response back to the vendor application 506. The vendor application 506 then sends an authentication confirmation to the browser 504 so that the user 502 can log in with appropriate permissions.

Figure 7:
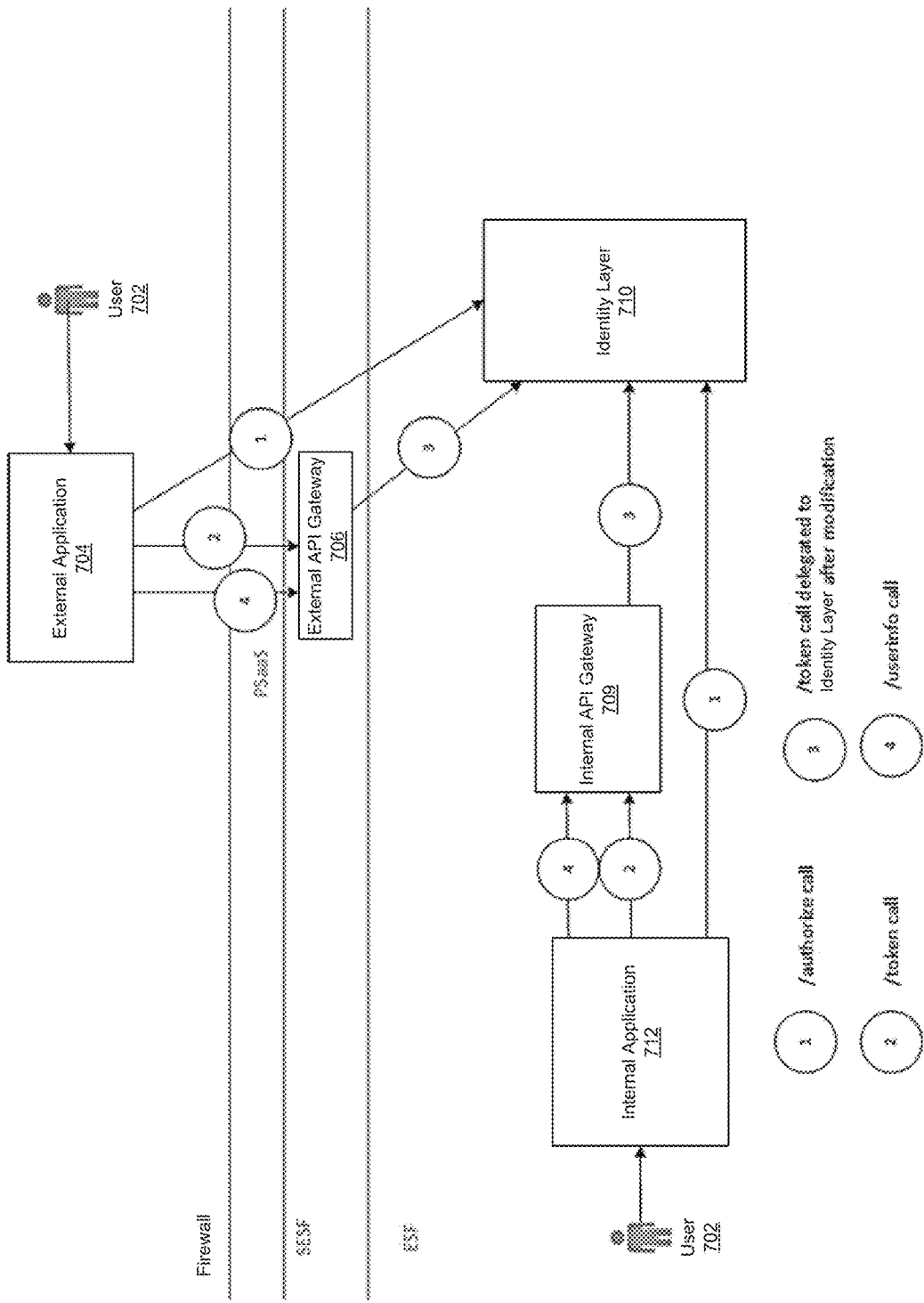
FIG. 7 illustrates an exemplary architecture implemented by the platform and language agnostic identity layer verification proxy module of FIG. 4 in accordance with an exemplary embodiment.

FIG. 7 illustrates an exemplary architecture 700 implemented by the platform and language agnostic ILVPM 406 of FIG. 4 in accordance with an exemplary embodiment. Referring back to FIG. 5, according to exemplary embodiments, the OIDC proxy may be deployed on internet facing Apigee API Gateway (external API gateway 706) and is available to vendor applications (i.e., vendor application 506) running outside of an internal firewall of an organizational computing network infrastructure, but the disclosure is not limited thereto. The vendor applications can access the OIDC proxy URL over internet. No firewall openings are needed. For vendors running inside the organizational computing network infrastructure, the same proxy can be deployed on an internal Apigee API Gateway (i.e., internal API gateway 709), but the disclosure is not limited thereto. As illustrated in FIG. 7, a user 702 may seek access to an external application 704 or an internal application 712. The external API gateway 706 may be implemented between the external application 704 and the identity layer 710 and the internal API gateway 709 may be implemented between the internal application 712 and the identity layer 710. The identity layer 710 may be the same or similar to the identity layer 510 as illustrated in FIG. 5.

According to exemplary embodiments, as illustrated in FIG. 7, at step 1, an authorize call may be made by the external application 704 to the identity layer 710 based on user input data received from the user 702. At step 2, a token call may be made by the external application 704 to the external API gateway 706. At step 3, token call may be delegated to the identity layer 710 after modification by the external API gateway 706. At step 4 a user information call may be made by the external application 704 to the external API gateway 706.

Similarly, according to exemplary embodiments, as illustrated in as illustrated in FIG. 7, at step 1, an authorize call may be made by the internal application 712 to the identity layer 710 based on user input data received from the user 702. At step 2, a token call may be made by the internal application 712 to the internal API gateway 709. At step 3, token call may be delegated to the identity layer 710 after modification by the internal API gateway 709. At step 4 a user information call may be made by the internal application 712 to the internal API gateway 712.

FIG. 8 illustrates an exemplary structure of a token 800 generated by the ILVPM 406 of FIG. 4 in accordance with an exemplary embodiment. As part of the access_token, the identity layer 510, 710 returns the roles or groups to which the user 502, 702 belongs. The structure of the token 800 is illustrated in FIG. 8. To map these roles to the vendor roles, the vendor application 506 (as illustrated in FIG. 5) has to make changes to read the access_token and understand the role names as assigned by identity layer 510, 710. The ILVPM 406 of FIG. 4 is configured to create custom methods in the proxy to check for specific role prefixes and return correctly formatted roles back to the vendor application 506. For example, for Sagemaker Groundtruth, the ILVPM 406 may be configured to create a method/userinfo that looks for roles with prefix of SMGT* and returns only the 1st part of the role, e.g., if the role assigned by the identity layer 510, 710 is SMGTbda4ba792631c30a3355b4e7d2b9c8b3-14656-105006-PROD, it returns the role "SMGTbda4ba792631c30a3355b4e7d2b9c8b3". This obviates the need for vendor to make changes, thereby improving system performance.

Referring back to FIGS. 4, 5, and 7, the communication module 414 may be configured to establish a communication link between an application and an API gateway via a communication interface. The implementing module 416 may be configured to implement the API gateway between the application and an identity layer 510, 710 configured to verify identity and roles of a user 502, 702 of the application, wherein the identity layer 510, 710 may be an OIDC provider having an OIDC protocol configured for authenticating and authorizing the user 502, 702 based on verifying pre-stored user profile data based on roles of the user and identity information data of the user 502, 702 from a database (i.e., 412). The creating module 418 may be configured to create a custom protocol within the API gateway. The receiving module 420 may be configured to receive data from the OIDC protocol. The determining module 422 may be configured to determine, based on analyzing the data received from the OIDC protocol, any communication gap between the application and the identity layer 510, 710. The converting module 424 may be configured to convert, in response to determining a communication gap, the data received from the OIDC protocol into a formatted data that is understandable by the application. The transmitting module 426 may be configured to transmit the formatted data to the application and the executing module 428 may be configured to automatically eliminate the communication gap between the application and the identity layer based on the received formatted data.

According to exemplary embodiments, the application may be an external application 704, external to the identity layer 510, 710 (OIDC provider), running on a public cloud and requires firewall authentication for access, i.e., PSaaS (physical security as a service), UI logic layer (SESF—server external security facility), ESF (i.e., enterprise server external security facility).

According to exemplary embodiments, the API gateway may be an external API gateway 706 implemented between the external application 704 and the identity layer 710 configured to verify identity and roles of the user of the external application 704.

According to exemplary embodiments, the application may be an internal application 712, internal to the identity layer 510, 710 (OIDC provider), running on a private cloud and does not require firewall authentication for access.

According to exemplary embodiments, the API gateway may be an internal API gateway 709 implemented between the internal application 712 and the identity layer 510, 710 configured to verify identity and roles of the user of the internal application 702.

According to exemplary embodiments, the creating module 418 may be configured to create the custom protocol in the API gateway to check for specific role prefixes of the user and return correctly formatted roles back to the application.

According to exemplary embodiments, the creating module 418 may be configured to create the custom protocol in a manner such that the protocol understands the data coming in from the identity layer 510, 710 and modifies the data so that when the identity layer 510, 710 returns data to the application (i.e., external application 704; internal application 712), the data first hits the corresponding API gateway (i.e., external API gateway 706; internal API gateway 709) for necessary conversion without directly going to the application.

According to exemplary embodiments, the crating module 418 may be configured to create the custom protocol in a manner such that that the protocol understands the data coming in from the identity layer 510, 710; and modify the data so that when the identity layer returns data to the application (i.e., external application 704; internal application 712), the data first hits the corresponding API gateway (i.e., external API gateway 706; internal API gateway 709) for necessary conversion without directly going to the application.

Figure 6:
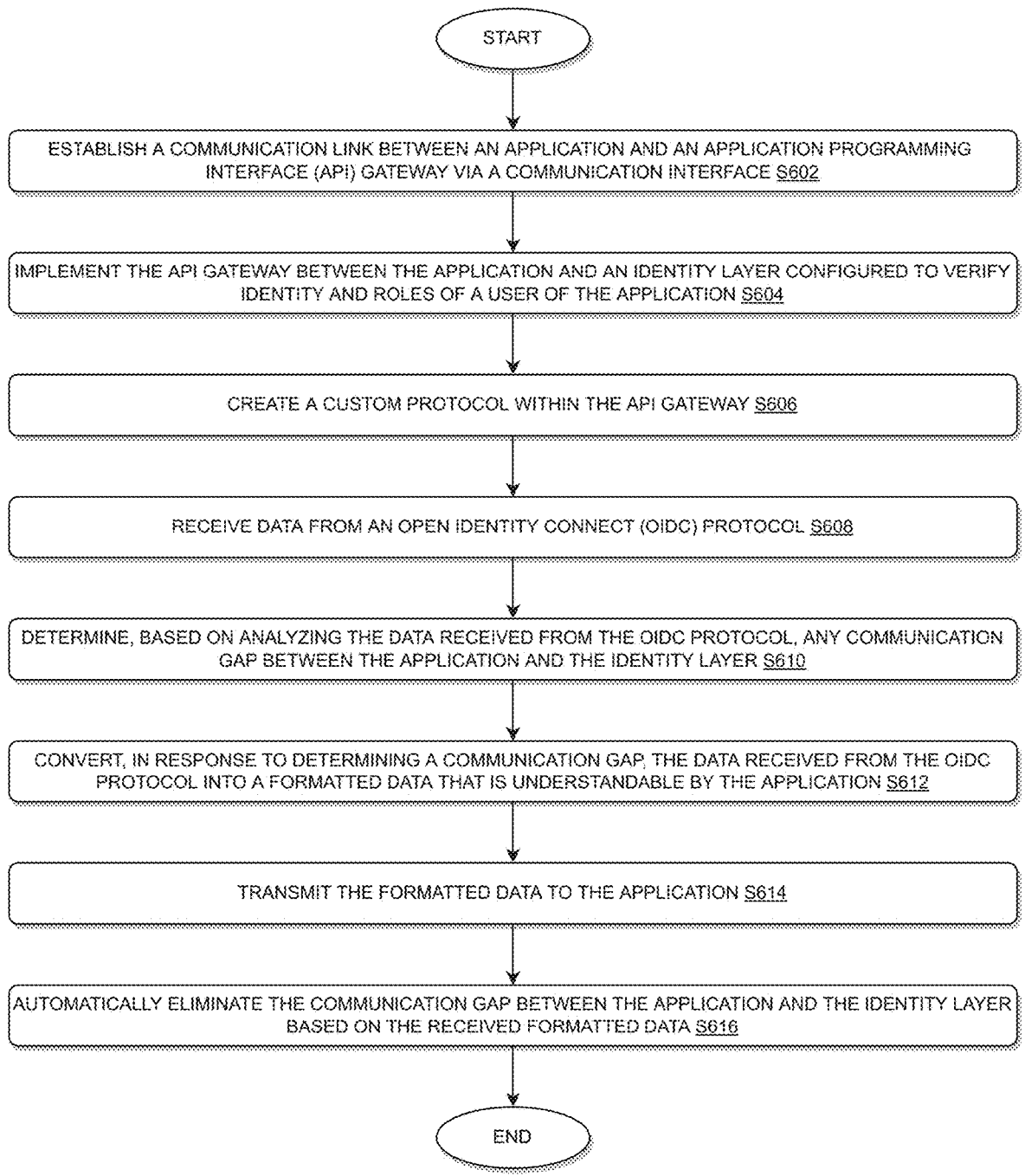
FIG. 6 illustrates a flow chart implemented by the platform and language agnostic identity layer verification proxy module of FIG. 4 for automatically authenticating and authorizing user access to an application in accordance with an exemplary embodiment.

FIG. 6 illustrates a flow chart 600 implemented by the platform and language agnostic ILVPM of FIG. 4 for automatically authenticating and authorizing user access to an application in accordance with an exemplary embodiment. It will be appreciated that the illustrated process 700 and associated steps may be performed in a different order, with illustrated steps omitted, with additional steps added, or with a combination of reordered, combined, omitted, or additional steps.

As illustrated in FIG. 6, at step S602, the process 600 may include establishing a communication link between an application and an API gateway via a communication interface.

At step S604, the process 600 may include implementing the API gateway between the application and an identity layer configured to verify identity and roles of a user of the application, wherein the identity layer is an OIDC provider having an OIDC protocol configured for authenticating and authorizing the user based on verifying pre-stored user profile data based on roles of the user and identity information data of the user from a database.

At step S606, the process 600 may include creating a custom protocol within the API gateway;

At step S608, the process 600 may include receiving data from an OIDC protocol.

At step S610, the process 600 may include determining, based on analyzing the data received from the OIDC protocol, any communication gap between the application and the identity layer.

At step S612, the process 600 may include converting, in response to determining a communication gap, the data received from the OIDC protocol into a formatted data that is understandable by the application.

At step S614, the process 600 may include transmitting the formatted data to the application.

At step S614, the process 600 may include generating alerts data based on analyzing the outlier behavior data.

At step S616, the process 600 may include automatically eliminating the communication gap between the application and the identity layer based on the received formatted data.

According to exemplary embodiments, the process 600 may further include: creating the custom protocol in the API gateway to check for specific role prefixes of the user and return correctly formatted roles back to the application.

According to exemplary embodiments, the process 600 may include: creating the custom protocol in a manner such that the protocol understands the data coming in from the OIDC protocol and modifies the data so that when a request comes in from the application, the request first hits the API gateway for necessary conversion without directly going to the identity layer.

According to exemplary embodiments, the process 600 may further include creating the custom protocol in a manner such that the protocol understands the data coming in from the identity layer; and modifying the data so that when the identity layer returns data to the application, the data first hits the API gateway for necessary conversion without directly going to the application.

According to exemplary embodiments, the ILVPD 402 may include a memory (e.g., a memory 106 as illustrated in FIG. 1) which may be a non-transitory computer readable medium that may be configured to store instructions for implementing an ILVPM 406 for integrating incompatible OIDC implementations as disclosed herein. The ILVPD 402 may also include a medium reader (e.g., a medium reader 112 as illustrated in FIG. 1) which may be configured to read any one or more sets of instructions, e.g., software, from any of the memories described herein. The instructions, when executed by a processor embedded within the ILVPM 406, 506 or within the ILVPD 402, may be used to perform one or more of the methods and processes as described herein. In a particular embodiment, the instructions may reside completely, or at least partially, within the memory 106, the medium reader 112, and/or the processor 104 (see FIG. 1) during execution by the ILVPD 402.

According to exemplary embodiments, the instructions, when executed, may cause a processor embedded within the ILVPM 406 or the ILVPD 402 to perform the following: establishing a communication link between an application and an API gateway via a communication interface; implementing the API gateway between the application and an identity layer configured to verify identity and roles of a user of the application, wherein the identity layer is an OIDC provider having an OIDC protocol configured for authenticating and authorizing the user based on verifying pre-stored user profile data based on roles of the user and identity information data of the user from a database; creating a custom protocol within the API gateway; receiving data from the OIDC protocol; determining, based on analyzing the data received from the OIDC protocol, any communication gap between the application and the identity layer; converting, in response to determining a communication gap, the data received from the OIDC protocol into a formatted data that is understandable by the application; transmitting the formatted data to the application; and automatically eliminating the communication gap between the application and the identity layer based on the received formatted data. The processor may be the same or similar to the processor 104 as illustrated in FIG. 1 or the processor embedded within ILVPD 202, ILVPD 302, ILVPD 402, and ILVPM 406.

According to exemplary embodiments, the instructions, when executed, may further cause the processor 104 to perform the following: creating the custom protocol in the API gateway to check for specific role prefixes of the user and return correctly formatted roles back to the application.

According to exemplary embodiments, the instructions, when executed, may further cause the processor 104 to perform the following: creating the custom protocol in a manner such that the protocol understands the data coming in from the OIDC protocol; and modifying the data so that when a request comes in from the application, the request first hits the API gateway for necessary conversion without directly going to the identity layer.

According to exemplary embodiments, the instructions, when executed, may further cause the processor 104 to perform the following: creating the custom protocol in a manner such that the protocol understands the data coming in from the identity layer; and modifying the data so that when the identity layer returns data to the application, the data first hits the API gateway for necessary conversion without directly going to the application.

According to exemplary embodiments as disclosed above in FIGS. 1-8, technical improvements effected by the instant disclosure may include a platform for implementing a platform and language agnostic identity layer verification proxy module that is configured to create a pattern (proxy) for integrating incompatible OIDC implementations for automatically authenticating and authorizing users against predefined roles to access to an internal application within an internal network or an external application outside of the internal network requiring additional firewall authentication, but the disclosure is not limited thereto.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for integrating incompatible open identity connect (OIDC) implementations by utilizing one or more processors along with allocated memory, the method comprising:
    establishing a communication link between an application and an application programming interface (API) gateway via a communication interface;
    implementing the API gateway between the application and an identity layer configured to verify identity and roles of a user of the application, wherein the identity layer is an OIDC provider having an OIDC protocol configured for authenticating and authorizing the user based on verifying pre-stored user profile data based on roles of the user and identity information data of the user from a database;
    creating a custom protocol within the API gateway;
    receiving data from the OIDC protocol;
    determining, based on analyzing the data received from the OIDC protocol, any communication gap between the application and the identity layer;
    converting, in response to determining a communication gap, the data received from the OIDC protocol into a formatted data that is understandable by the application;
    transmitting the formatted data to the application; and
    automatically eliminating the communication gap between the application and the identity layer based on the received formatted data.

2. The method according to claim 1, wherein the application is an external application, external to the OIDC provider, running on a public cloud and requires firewall authentication for access.

3. The method according to claim 2, wherein the API gateway is an external API gateway implemented between the external application and the identity layer configured to verify identity and roles of the user of the external application.

4. The method according to claim 1, wherein the application is an internal application, internal to the OIDC provider, running on a private cloud and does not require firewall authentication for access.

5. The method according to claim 4, wherein the API gateway is an internal API gateway implemented between the internal application and the identity layer configured to verify identity and roles of the user of the internal application.

6. The method according to claim 1, further comprising:
creating the custom protocol in the API gateway to check for specific role prefixes of the user and return correctly formatted roles back to the application.

7. The method according to claim 1, wherein the custom protocol is created in a manner such that the protocol understands the data coming in from the OIDC protocol and modifies the data so that when a request comes in from the application, the request first hits the API gateway for necessary conversion without directly going to the identity layer.

8. The method according to claim 7, wherein the custom protocol is created in a manner such that the protocol understands the data coming in from the identity layer and modifies the data so that when the identity layer returns data to the application, the data first hits the API gateway for necessary conversion without directly going to the application.

9. A system for integrating incompatible open identity connect (OIDC) implementations, the system comprising:
a processor; and
a memory operatively connected to the processor via a communication interface, the memory storing computer readable instructions, when executed, causes the processor to:
establish a communication link between an application and an application programming interface (API) gateway via a communication interface;
implement the API gateway between the application and an identity layer configured to verify identity and roles of a user of the application, wherein the identity layer is an OIDC provider having an OIDC protocol configured for authenticating and authorizing the user based on verifying pre-stored user profile data based on roles of the user and identity information data of the user from a database;
create a custom protocol within the API gateway;
receive data from the OIDC protocol;
determine, based on analyzing the data received from the OIDC protocol, any communication gap between the application and the identity layer;
convert, in response to determining a communication gap, the data received from the OIDC protocol into a formatted data that is understandable by the application;
transmit the formatted data to the application; and
automatically eliminate the communication gap between the application and the identity layer based on the received formatted data.

10. The system according to claim 9, wherein the application is an external application, external to the OIDC provider, running on a public cloud and requires firewall authentication for access.

11. The system according to claim 10, wherein the API gateway is an external API gateway implemented between the external application and the identity layer configured to verify identity and roles of the user of the external application.

12. The system according to claim 9, wherein the application is an internal application, internal to the OIDC provider, running on a private cloud and does not require firewall authentication for access.

13. The system according to claim 12, wherein the API gateway is an internal API gateway implemented between the internal application and the identity layer configured to verify identity and roles of the user of the internal application.

14. The system according to claim 9, wherein the processor is further configured to: create the custom protocol in the API gateway to check for specific role prefixes of the user and return correctly formatted roles back to the application.

15. The system according to claim 14, wherein the custom protocol is created in a manner such that the protocol understands the data coming in from the identity layer and modifies the data so that when the identity layer returns data to the application, the data first hits the API gateway for necessary conversion without directly going to the application; and wherein the custom protocol is created in a manner such that the protocol understands the data coming in from the identity layer and modifies the data so that when the identity layer returns data to the application, the data first hits the API gateway for necessary conversion without directly going to the application.

16. A non-transitory computer readable medium configured to store instructions for integrating incompatible open identity connect (OIDC) implementations, wherein, when executed, the instructions cause a processor to perform the following:
establishing a communication link between an application and an application programming interface (API) gateway via a communication interface;
implementing the API gateway between the application and an identity layer configured to verify identity and roles of a user of the application, wherein the identity layer is an OIDC provider having an OIDC protocol configured for authenticating and authorizing the user based on verifying pre-stored user profile data based on roles of the user and identity information data of the user from a database;
creating a custom protocol within the API gateway;
receiving data from the OIDC protocol;
determining, based on analyzing the data received from the OIDC protocol, any communication gap between the application and the identity layer;
converting, in response to determining a communication gap, the data received from the OIDC protocol into a formatted data that is understandable by the application;
transmitting the formatted data to the application; and
automatically eliminating the communication gap between the application and the identity layer based on the received formatted data.

17. The non-transitory computer readable medium according to claim 16, wherein the application is an external application, external to the OIDC provider, running on a public cloud and requires firewall authentication for access; and wherein the API gateway is an external API gateway implemented between the external application and the identity layer configured to verify identity and roles of the user of the external application.

18. The non-transitory computer readable medium according to claim 16, wherein the application is an internal application, internal to the OIDC provider, running on a private cloud and does not require firewall authentication for access; and wherein the API gateway is an internal API gateway implemented between the internal application and the identity layer configured to verify identity and roles of the user of the internal application.

19. The non-transitory computer readable medium according to claim 16, wherein the instructions, when executed, further cause the processor to perform the following:

creating the custom protocol in the API gateway to check for specific role prefixes of the user and return correctly formatted roles back to the application.

20. The non-transitory computer readable medium according to claim 16, wherein the custom protocol is created in a manner such that the protocol understands the data coming in from the OIDC protocol and modifies the data so that when a request comes in from the application, the request first hits API gateway for necessary conversion without directly going to the identity layer; and wherein the custom protocol is created in a manner such that the protocol understands the data coming in from the identity layer and modifies the data so that when the identity layer returns data to the application, the data first hits the API gateway for necessary conversion without directly going to the application.

* * * * *